Nov. 8, 1938.  M. P. LAURENT  2,136,111
BRAKE
Filed Nov. 20, 1936
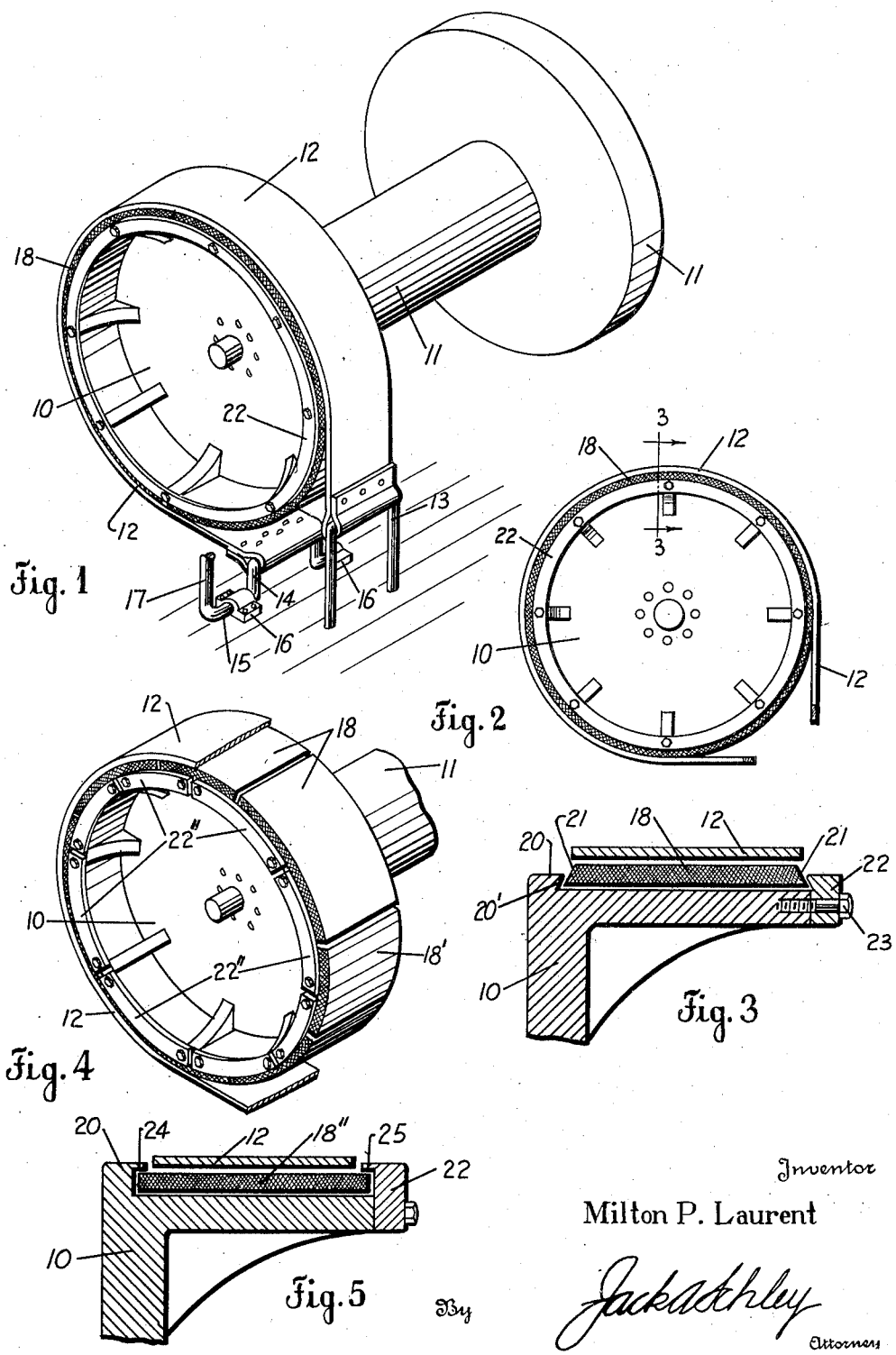
Inventor
Milton P. Laurent
By Jack Ashley
Attorney Patented Nov. 8, 1938

2,136,111

UNITED STATES PATENT OFFICE 2,136,111

BRAKE

Milton P. Laurent, Houston, Tex., assignor to W. K. M. Company, Incorporated, Houston, Tex., a corporation of Texas Application November 20, 1936, Serial No. 111,760

2 Claims. (Cl. 188—77)

This invention relates to new and useful improvements in brakes.

One object of the invention is to provide an improved brake for use with large wheels of draw works and other heavy stationary machinery, as well as for mobile equipment, either heavy or high speed units.

An important object of the invention is to provide an improved brake in which the lining is free from positive connection with the drum or the brake band, whereby said lining may float or move around said drum; and also, whereby the usual rivets, or fastening means for the lining are eliminated, which permits the entire area of the lining to be utilized for the braking operation.

Another object of the invention is to provide a brake so constructed that both surfaces of the lining may be employed for braking purposes, whereby a more efficient braking is obtained and the life of the lining is increased.

Still another object of the invention is to provide an improved brake, wherein the brake lining is unattached to either the brake drum or the band, with retaining means for holding said band in position on the drum; said means being constructed so that it may be readily removed to facilitate mounting or removal of the lining on said drum.

A further object of the invention is to provide an improved brake lining which is constructed in a plurality of arcuate sections or segments adapted to fit around the brake drum to form a substantially continuous lining; the sections being individually removable from the drum for replacement, or for any other purpose.

Another object of the invention is to provide a brake in which the usual rivets or other fastening means for the lining are eliminated, whereby the brake drum or band does not become scored and longer life for said drum and band is obtained.

A construction designed to carry out the invention will be hereinafter described, together with other features of the invention The invention will be more readily understood from a reading of the following specification and by reference to the accompanying drawing, in which an example of the invention is shown, and wherein:

Figure 1 is an isometric view of a brake constructed in accordance with the invention;

Figure 2 is an end elevation of the same;

Figure 3 is an enlarged, transverse, sectional view, taken on the line 3—3 of Figure 2;

Figure 4 is an isometric view of a modified form of the invention; and

Figure 5 is a view similar to Figure 3, showing another modification of the invention.

In the drawing the numeral 10 designates a large brake drum or wheel, such as a bull wheel of a cable drum 11, as is used in oil field work. The usual brake band 12 encircles the wheel 10 and has one end attached to the floor or other suitable support by a yoke 13. The other end of the band is attached to a crank 14 formed in a shaft 15, being mounted in brackets 16, which are fastened to said floor. The outer end of the shaft 15 is provided with a lever 17, which is adapted to be swung by the operator, in order to actuate or swing the crank 14. It will be seen (Figure 1) that by swinging the lever 17, the crank 14 is swung so that the band 12 will be tightened on the wheel 10 of the drum 11. This is the usual construction for such brakes, and is not claimed as part of the invention.

Brake lagging or lining 18 is interposed between the wheel 10 and the brake band 12, and as is clearly shown in Figure 3, is not attached to either. The brake lining 18 may be woven, molded, or formed in any manner and of any material desired. The outer or braking surface of the wheel 10 is formed with an outwardly extending annular ring 20, which is preferably integral therewith. The ring is disposed along the peripheral edge portion of the wheel and is undercut or beveled at 20' on its inner side (Figure 3). One edge of the lining is formed with a complimentary beveled edge 21 which engages in the under-cut 20' of the ring. The other edge 21' of the lining 18 is correspondingly beveled.

An annular retaining ring 22 is suitably fastened to the outer edge of the wheel 10, such as by bolts 23, and the outer end of the ring projects beyond the braking surface of the wheel, preferably having its outer end lying in the same plane as the outer end of the integral ring 20. The inner side of the extended portion of the ring 22 is under-cut or beveled at 22', so as to engage over the outer beveled edge 21' of the lining 18 (Figure 3). The retaining ring 22 may be readily removed, as will be seen in Figures 1, 2 and 3, so that the lining may be mounted or removed as desired.

In operation, when the wheel 10 is revolving and the brake band 12 not tightened, the brake lining 18 is free from both the wheel and the band, so that said lining may float on said wheel; although at this time the lining will probably rotate with said wheel, due to frictional contact with the surface thereof and the rings 20 and 22. When the brake is applied and the band 12 tightened on the lining 18, pressure will be applied to said lining and obviously, the braking will be performed by both flat surfaces or sides of the lining, as said lining is tightened against both band and wheel simultaneously. As above pointed out, the lining will probably be rotating with said wheel, due to slight frictional engagement therewith and with the rings 20 and 22, yet when the brake band is tightened, this rotation will be immediately slowed down or checked and the band tightened between both members simultaneously. It is pointed out that the lining is not fastened to either the band or the wheel and it may float therebetween, and thus when the band is tightened there will be more or less a tendency for the braking to occur on both surfaces of the lining and not on either the band or the wheel exclusively. When it is desired to remove the lining 18 from between the wheel and the band, the bolts 23 are removed and the solid ring 22 may be slipped from its place so as to allow the lining to be removed.

In Figure 4, the lining 18' has been shown in arcuate sections or segments. These segments, as shown, may be of any size that proves satisfactory, which may be much larger than shown in the drawing, or may be even very much smaller. The lining surrounding said wheel also may be in two or three segments and work as satisfactory as a number of segments. One of the advantages of having the lining made into two or more segments, is that should the lining become worn, it is possible that the entire lining will not be worn out, but only a portion or certain segments. Therefore with the segments, only the worn portion needs to be replaced.

It will be seen that with applicant's invention, it is possible to use the lining for a much longer period of time and to a greater degree of use, because of the ease and quickness with which the worn portion of said lining may be replaced. Inasmuch as it is not attached to either the band 12 or the wheel 10, the usual rivets or other holding means will not take up and waste from one-fourth to one-half of the thickness of said lining, as is true of the present brakes now in common use. The invention is very flexible and may be readily adjusted to various conditions and circumstances encountered in the various installations.

The ring 22 has been shown in Figures 1, 2 and 3 as made in one piece, whereas in Figure 4 it is shown as being made into a number of pieces or sections 22''. It is pointed out that each section of the ring 22'' is approximately the same size or slightly larger than one of the segments of the brake lining 18'. It is possible for the retaining ring 22 to be made in any suitable manner, and I have shown only two of the various ways in which the ring could be made, in order to facilitate the mounting and replacing of the brake lining.

In Figure 5, I have shown a slightly modified form of the invention in which the rim 20 is provided with an overhanging lip 24, and retaining ring 22 is provided with a similar overhanging lip 25. In this form, the edges of the brake lining 18'' are not beveled. The lining is mounted beneath and extends between the overhanging lips 24 and 25, and the band 12 partially surrounds the lining and extends between the lips 24 and 25.

The invention has been shown and described as being applied to the bull wheel of a draw works, although said invention may very readily be adapted for trucks, trailers, automobiles, tractors and any other use for which a brake may be required.

What I claim and desire to secure by Letters Patent is:

1. A brake including, a brake drum, a movable external braking member, a brake lining interposed between the circumference of said drum and said braking member, said lining being in separate segments and free from positive connection with each other and the drum and the braking member, whereby both the inner and outer annular surfaces of said lining are presented for braking purposes, and opposed annular inwardly overhanging circumferential rings on said drum for retaining said lining marginally in its interposed position, the retaining ring at one side being in removable sections so that said segments of the brake lining may be replaced.

2. A brake including, a brake drum, a movable external braking member, and a brake lining interposed loosely between said drum and said braking member, said drum being annularly channeled circumferentially so that said lining may be placed therein and the side walls of the channel being undercut to overhang the marginal portions of the lining, one side wall being removable.

MILTON P. LAURENT.